(12) United States Patent
Long et al.

(10) Patent No.: US 12,545,301 B2
(45) Date of Patent: Feb. 10, 2026

(54) BACKING RING ASSEMBLY FOR RAILWAY AXLES

(71) Applicant: AKTIEBOLAGET SKF, Gothenburg (SE)

(72) Inventors: Andrea Long, San Germano Chisone (IT); Giorgia D'Amico, Turin (IT); Giuseppe Guala, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 873 days.

(21) Appl. No.: 17/846,210

(22) Filed: Jun. 22, 2022

(65) Prior Publication Data

US 2023/0001965 A1    Jan. 5, 2023

(30) Foreign Application Priority Data

Jun. 30, 2021    (IT) .......................... 102021000017090

(51) Int. Cl.
 *B61F 15/20* (2006.01)
(52) U.S. Cl.
 CPC .................................... *B61F 15/20* (2013.01)
(58) Field of Classification Search
 CPC ...... B61F 15/22; F16C 35/063; F16C 35/073; F16C 2326/10; F16C 33/768; F16C 33/782; F16C 33/783; B60B 2900/5112
 See application file for complete search history.

(56) References Cited

U.S. PATENT DOCUMENTS

| | | | |
|---|---|---|---|
| 8,657,299 B2 | 2/2014 | Rode et al. | |
| 9,016,950 B2 | 4/2015 | Buchanan et al. | |
| 10,625,757 B2 | 4/2020 | Conway, Jr. | |
| 2005/0052043 A1* | 3/2005 | Brister | F16C 35/063 295/36.1 |
| 2006/0251352 A1* | 11/2006 | Reed | F16C 35/063 384/477 |
| 2012/0195540 A1* | 8/2012 | Hubbard | B61F 15/22 384/572 |
| 2013/0230265 A1 | 9/2013 | Hubbard et al. | |

(Continued)

FOREIGN PATENT DOCUMENTS

| | | |
|---|---|---|
| CA | 2748154 | 7/2012 |
| CA | 2845818 | 2/2013 |

(Continued)

OTHER PUBLICATIONS

Search Report for corresponding Italy Patent Application No. 202100017090 dated Mar. 8, 2022.

*Primary Examiner* — S. Joseph Morano
*Assistant Examiner* — Emily G. Castonguay
(74) *Attorney, Agent, or Firm* — J-TEK LAW PLLC; Scott T. Wakeman; Mark A. Ussai

(57) ABSTRACT

A support ring assembly for a railway axle having a support ring configured to be inserted between a rolling bearing and a collar of the railway axle, the support ring having an annular seat, a surface of a radially inner side wall fitted with a radial clearance over the collar and an end wall that abuts against the collar, an annular insert fitted into the seat by means of an annular shield and having an elastomeric annular element having at least two annular protuberances that engage with the collar, the annular element configured to engage with the collar so as to occupy the radial clearance.

20 Claims, 3 Drawing Sheets

(56) References Cited

U.S. PATENT DOCUMENTS

2014/0161381 A1* 6/2014 Buchanan ............. F16C 35/063
  384/477
2016/0355196 A1* 12/2016 Johansson ............. F16C 35/063
2019/0329799 A1    10/2019 Conway, Jr.
2020/0292000 A1     9/2020 Xin

FOREIGN PATENT DOCUMENTS

| | | |
|---|---|---|
| CN | 1858455 | 11/2006 |
| CN | 102022441 | 4/2011 |
| CN | 103291765 | 9/2013 |
| CN | 106438724 | 2/2017 |
| EP | 1663752 | 6/2006 |
| EP | 2990673 | 3/2016 |

* cited by examiner

BACKING RING ASSEMBLY FOR RAILWAY AXLES

CROSS-REFERENCE TO RELATED APPLICATIONS

This application is based on and claims priority to Italian Patent Application No. 102021000017090 filed on Jun. 30, 2021, under 35 U.S.C. § 119, the disclosure of which is incorporated by reference herein.

FIELD

The present disclosure relates generally to a support ring assembly or unit for railway axles.

BACKGROUND

Railway axles, for example from U.S. Pat. No. 9,016,950B2, include a keying journal or shaft end on which there is mounted a rolling bearing generally forming part of a railway bushing. The rolling bearing may be mounted both in an outer axial or "outboard" position with respect to a wheel mounted angularly and integrally on the railway axle, in which position the rolling bearing is located closer to the outer side of a railway carriage than the wheel. Alternatively, the rolling bearing may be mounted in an axially inner or "inboard" position, in which the wheel is located closer to an outer side of the railway carriage than the rolling bearing.

BRIEF DESCRIPTION OF THE DRAWINGS

The disclosure will now be described with reference to the accompanying drawings, which illustrate a non-limiting exemplary embodiments thereof, in which.

DETAILED DESCRIPTION

In a first case, a support ring for the rolling bearing is generally inserted above or against a widened section or collar of the railway axle. In the second case, the support ring is generally packed between the rolling bearing and the collar, above a groove of the journal or shaft end which has the function of reducing the fatigue stresses. In a second case, the support ring is centered on the journal by means of a sleeve portion that projects axially outwards from an axial volume of the groove and that is seated inside an annular seat formed in an inner ring of the rolling bearing.

Problems arising from a high-interference coupling (i.e. no clearance) result in high stresses with consequent risks of damage to the collar itself due to the frequent bearing maintenance assembly and disassembly operations as well as an obvious risk of structural damage to the support ring.

An object of the present disclosure is to provide a support ring complex or assembly or unit which overcomes the drawbacks of known support ring assemblies, is simple and low cost to produce, and has small overall dimensions.

Based on this disclosure, a support ring assembly for railway axles having characteristic features described herein is therefore provided, in which the support ring assembly can be coupled on the axle at a widened section or collar of the railway axle, of a larger diameter, situated upstream of the journal or shaft end of the axle, so as to act as a shoulder for a rolling bearing mounted on the shaft end.

In particular, the support ring assembly according to this disclosure can be mounted correctly on a collar of a railway axle with a wide range of tolerances that are subject to high loads and therefore necessitate a very long working life, during which they are be subject to numerous maintenance operations.

Figure 1:
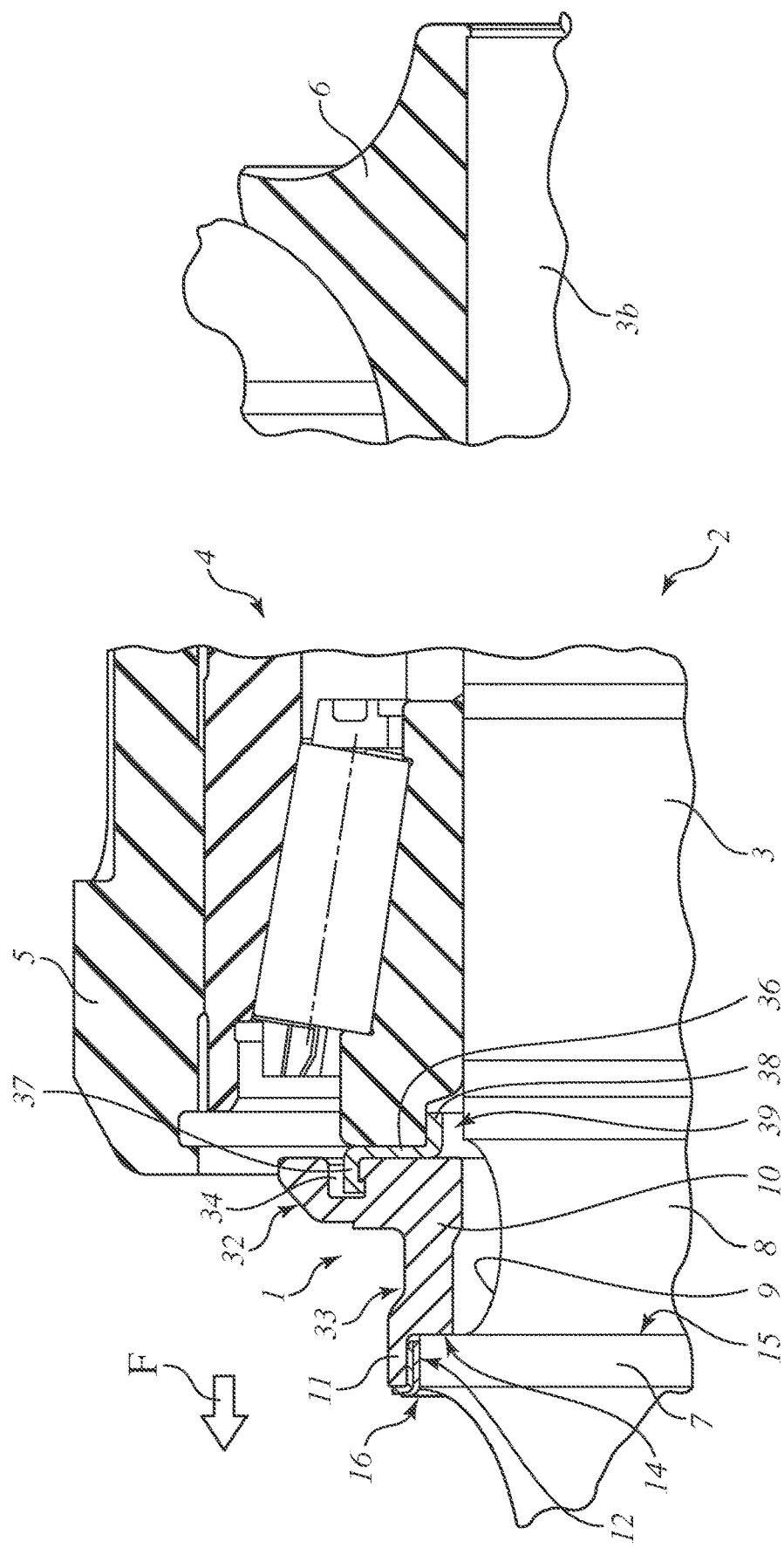
FIG. 1 is a schematic elevation and radially sectioned view of one end of a railway axle provided with a rolling bearing and forming part of a railway bushing, not shown in its entirety for simpler illustration, and a support ring assembly for the rolling bearing in accordance with this disclosure.
Figure 2:
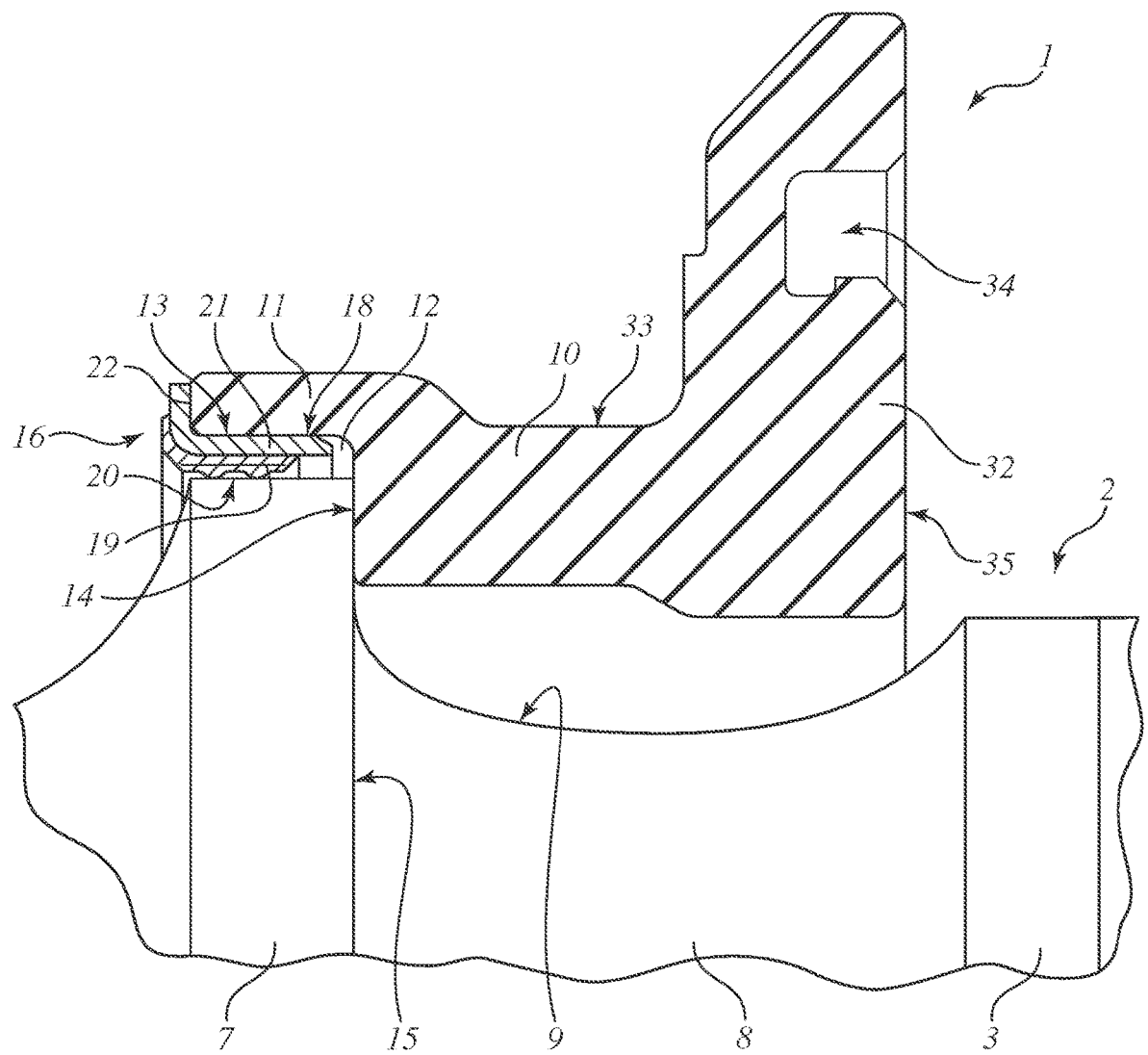
FIG. 2 is an enlarged, schematic elevation view of a radial section of the support ring assembly according to exemplary embodiments of this disclosure.
Figure 3:
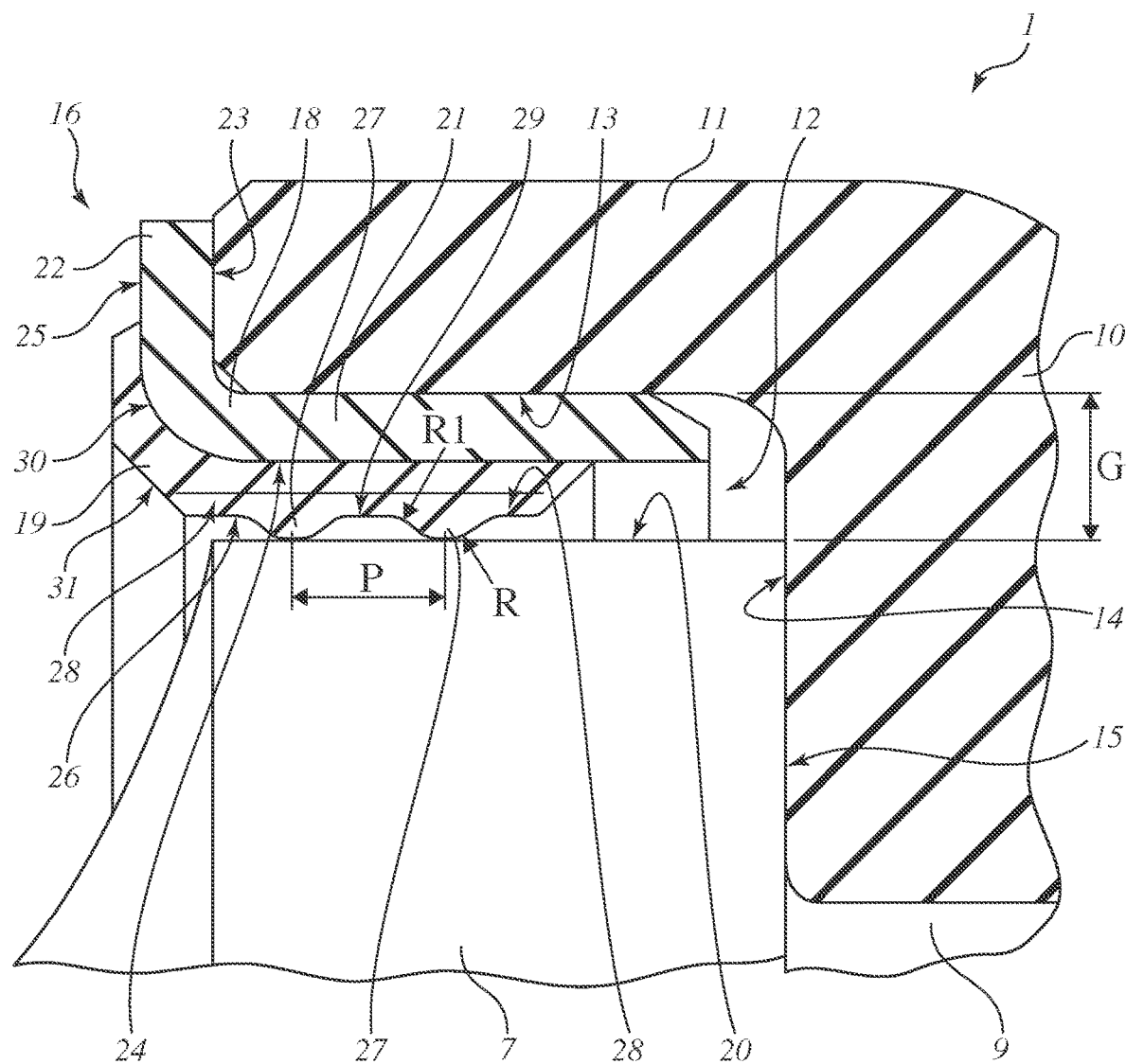
FIG. 3 is an enlarged detail view of FIG. 2 illustrating a coupling between the support ring assembly and the collar of the railway axle according to exemplary embodiments of this disclosure.

With reference to FIGS. 1-3, a support ring assembly 1 may configured to be coupled, during use, on a journal or shaft end 3 of a railway axle 2 so as to act as an axial shoulder for a rolling bearing 4 mounted in a known manner on shaft end 3.

Rolling bearing 4 may form part of a railway bushing 5, shown only partly for simplicity of illustration, that supports in an idle manner railway axle 2 and on which one or more wheels 6 of a railway carriage (not shown) are keyed during use.

Wheels 6 may be connected so as to be angularly integral with railway axle 2 on opposite shaft ends 3 thereof. Opposite shaft ends 3 may be symmetrical with each other. For simplicity of illustration, the disclosure will be described with reference to only one shaft end 3 and only one wheel 6, as shown in FIG. 1.

In a position opposite shaft end 3 and, in particular, opposite to an end portion 3b thereof, railway axle 2 may include a widened section or collar 7 connected to shaft end 3 by means of a connecting section 8 provided with an annular groove 9 configured to reduce fatigue stresses acting on railway axle 2.

In various embodiments, wheel 6 may be integrally supported by end portion 3b of shaft end 3, and therefore on a side opposite collar 7, while rolling bearing 4 may be mounted on shaft end 3 at an axially inward position relative to wheel 6, facing collar 7 and substantially adjacent to groove 9. Such embodiments may be referred to as an inboard application. Although not described in this disclosure, it should be appreciated that embodiments consistent with this disclosure may be for an outboard application. In embodiments consistent with an outboard application, rolling bearing 4 may be mount fitted onto end portion 3b of shaft end 3 while wheel 6 may be supported by railway axle 2 at an axially inward position relative to rolling bearing 4 and immediately beyond collar 7. Wheel 6 may therefore be on a side opposite to end portion 3b and a connecting point 8, which does not have a groove 9, but is defined by an annular section with a concave curved surface.

In various embodiments, a support ring assembly 1 may include a support ring 10 made of a high-strength and substantially rigid steel (or other metal alloy) and configured to be coupled, during use, on a shaft end 3 of a railway axle 2. Support ring 10 may be in axial abutment between rolling bearing 4 coupled on shaft end 3 and collar 7 of railway axle 2. Collar 7 may alternatively be a widened section 7.

Support ring 10 may further include a first axial end 11 provided radially on an inside of support ring 10. First axial end 11 may include a first cup-shaped annular seat 12 bounded by a side wall 13 that is radially inner, i.e. radially facing an inside of seat 12, and by a flat annular end wall 14.

In various embodiments, radially inner side wall 13 of seat 12 may be configured to be fitted, during use, over collar 7 and with a radial clearance G radially on an outside of collar 7.

In various embodiments, annular end wall 14 of seat 12 may be configured to come, during use, into axial abutment against collar 7, which for this purpose may be provided with a flat front face 15 facing shaft end 3 and immediately adjacent to groove 9.

Support ring assembly 1 may further include an annular insert 16 that is interference-fitted into seat 12 and configured to occupy entirely, during use, clearance G.

Annular insert 16 may include a radially outer annular shield 18, which is substantially rigid and engaged integrally inside seat 12, and a radially inner annular element 19, made of an elastomeric material and supported rigidly as one piece by annular shield 18, so as to extend at least partly radially on an inside of annular shield 18. In some embodiments, annular insert 16 is formed integrally as one piece annular shield 18.

Elastomeric annular element 19 may be configured to be interposed, during use, between annular shield 18 and a radially outer, cylindrical side surface 20 of collar 7 and configured to engage in close contact with collar 7. In various embodiments, elastomeric annular element 19 is configured to completely occupy radial clearance G over a first radial volume exceeding a second radial volume occupied by annular shield 18.

In various embodiments, an annular shield 18 may be made of a sheared and folded metal sheet, typically made of steel, and may have a substantially L shaped radial cross-section.

Annular shield 18 may include a sleeve portion 21 force-fitted, e.g., with radial interference, into seat 12 and in contact with a surface of side wall 13. Annular shield 18 may further include and a flange portion 22 that extends radially on an outside of sleeve portion 21. In various embodiments, flange portion 22 may extend from sleeve portion 21 at first axial end 11 of support ring 10. Flange portion 22 may further be engaged in axial abutment against a first front face 23 of first end 11 of support ring 10.

In various embodiments, an annular element 19 may be made of an elastomeric material covering at least a majority of a radially inner, cylindrical side surface 24 of sleeve portion 21 and extends over at least part of a front face 25 of flange portion 22. In various embodiments, front face 25 may have away from first front face 23 of first end 11 of support ring 10.

Throughout this disclosure, the expression "most" referring to an axial or radial or superficial extension of an entity must be understood as being a quantity greater than 50% and preferably greater than 70% of this entity. Therefore, for example, an elastomeric element 19 occupies more than 50% and preferably more than 70% of an axial extension of a side surface 24 of a sleeve portion 21, calculated from an edge of a flange portion 22.

Annular element 19 may be formed integrally as a single piece with shield 18. In various embodiments, annular element 19 may be integrally fixed as a single piece with sleeve portion 21 and flange portion 22 of annular shield 18 by means of bonding during vulcanization.

Annular element 19 may further include a radially inner annular surface 26 facing, during use, collar 7 and provided with at least two annular protuberances 27. In various embodiments, at least two annular protuberances may be arranged in tandem with each other (i.e. axially in sequence) and may be configured to always make engaging contact with collar 7 irrespective of a range of pre-set constructional tolerances of collar 7 and annular insert 16 and seat 12. Annular protuberances 27 may have a curved radial profile with a predefined first radius of curvature R.

In other words, annular protuberances 27 may be configured to ensure a minimum residual interference with collar 7 so that annular insert 16 may act as, during use, a static hydraulic sealing element between support ring 10 and collar 7 in relation to rolling bearing 4. In various embodiments, a minimum residual interference may be equal to 0 mm.

In this way, a support ring assembly 1 according to this disclosure reduces high stresses and increased risk of damage to collar 7 arising from a high-interference coupling. A support ring assembly 1 further performs a sealing function to seal off external environmental contaminants such as water, dust, and mud, as well as other contaminants, such as friction materials (resulting from e.g., a braking system), washing liquids, oi, and rust (caused by external surfaces of carriage members).

In particular, if annular insert 16 were not present, water may infiltrate and reach a transition zone between collar 7 and a seat of rolling bearing 4. This transition zone may be a critical zone in which stresses due to loads increase. For this reason, a discharge groove 9 (e.g., regulated according to Commonwealth Standard Network (CSN) European Standard (EN) 13103) may be inserted between collar 7 and the seat of rolling bearing 4. Oxidation and resulting rust in this transition zone may result in fatigue breakages of railway axle 2.

In various embodiments, radially inner annular surface 26 of annular element 19 may include two distal cylindrical end sections 28 immediately adjacent to and on opposite sides of annular protuberances 27 and may include at least one central section 29 interposed between annular protuberances 27 and arranged flush with cylindrical end sections 28.

Central section 29 may be cylindrical and connected to the curved radial profile of the annular protuberances 27 by a curved section having a second predefined radius R1. In various embodiments, R1 may have a same absolute value but opposite curvature as R. In other embodiments, R1 may not have a same absolute value as R without departing from the scope of this disclosure.

Under conditions causing minimum interference, protuberances 27 may be configured to adhere to side surface 20 and exert a hydraulic sealing action to seal off collar 7 from external contaminants. Under conditions causing maximum interference, protuberances 27 may be configured to compress elastically without being completely radially compressed, improving the quality of the sealing action and ensuring a small degree of friction with collar 7 both during assembly and disassembly of axle 2. In this way, a support ring assembly 1 according to the present disclosure improves upon known support ring assemblies.

Furthermore, protuberances 27 may recompact along central section 29 to avoid damage to support ring assembly 1 both during assembly and during disassembly.

Annular protuberances 27 may further be axially spaced apart by central section 29 with a constant pitch P and such that the ratio of the radius of curvature R to the pitch P is approximately 1:3.

In various embodiments, sleeve portion 21 may have an axial length such that the annular element 19 may have more than two annular protuberances 27, for example three annular protuberances. In embodiments in which there are three protuberances 27, protuberances 27 may be spaced from each other by pitch P alongside surface 26, separated by two central sections 29, and disposed between two distal end sections 28.

In various embodiments, annular element 19 may be provided with a portion 30 that covers at least part of front face 25 of flange portion 22. A bevel 31 may be provided on portion 30, facing away from flange portion 22 and extending until flush with radially inner annular surface 26 of annular element 19. Thus, bevel 31 may face collar 7 during use.

Bevel 31 may facilitate mounting of support ring assembly 1 on collar 7.

Annular element 19 may have suitable dimensions and be made of a suitable material to be configured to have an elasto-plastic behavior, improving optimum behavior of support ring assembly during use.

In various embodiments, a support ring 10 may have an axial end 32 arranged axially opposite to a first end 11 and have a flange-shaped, which extends radially on an outside of a radially outer side surface 33 of the first axial end 11. Second axial end 32 may be provided with an annular seat 34 axially opposite to a seat 12 and defined by an annular front groove formed on a front face 35 of axial end 32.

In various embodiments, support ring assembly 1 may further include an annular spacer 36 made of a synthetic plastic material, e.g., a polyamide, and have a substantially Z-shaped radial cross-section.

A radially outer edge 37 of spacer 36 may snap-engage inside annular seat 34. In various embodiments, spacer 36 may be configured to remain interposed, during use, between support ring 10 and rolling bearing 4 and to engage, during use, with a radially inner opposite edge 38 inside a radially inner front seat 39 of rolling bearing 4.

During assembly, support ring assembly 1 may first be formed by force-fitting insert 16 inside seat 12 and engaging spacer 36 inside annular seat 34. Due to spacer 36 support ring assembly 1 may be pre-assembled on rolling bearing 4 by inserting radially inner opposite edge 38 inside radially inner front seat 39.

Thus, a resulting sub-unit formed by support ring assembly 1 and rolling bearing 4 (or only the assembly 1) may be assembled on the axle 2 by pushing along arrow F shown in in FIG. 1. Alternatively, a sub-unit may be formed by support ring assembly 1 only, and support ring assembly 1 still assembled on axle 2 by pushing along arrow F.

During this assembly step, insert 16 may be firmly fixed in axial abutment inside seat 12 so that it cannot be displaced in direction opposite to arrow F. Insert 16 may be inserted by means of pushing, and if necessary by means of forcing, onto cylindrical side surface 20 of collar 7, where the annular element 19 adapts to clearance G due to the curved-annular profile of annular protuberances 27. A size of clearance G may be related to machining tolerances and/or any re-machining with stock removal of side surface 20 of collar 7. This may include, but is not limited to, scoring caused during maintenance disassembly operations or similar damage due to wear. Due to the geometry of the support ring assembly 1 described herein, the insertion action may be gentle and have a small amount of friction.

The same occurs during any disassembly for maintenance purposes, in which support ring assembly 1 is extracted by means of pushing the direction opposite arrow F, thus eliminating risk of damage to both support ring 10 and railway axle 2. All of this without any loss of efficiency during the secondary, but no less important. Furthermore, there is no loss of efficiency of the static hydraulic sealing action.

We claim:

1. A support ring assembly for a railway axle configured to be coupled, during use, on a shaft end of the railway axle and to act as a shoulder for a rolling bearing mounted on the shaft end, the support ring assembly comprising:
   a support ring configured to be coupled, during use, in an axially abutting manner between the rolling bearing and a collar of the railway axle, the support ring comprising:
      a first axial end provided radially on an inside of a first annular cup-shaped seat,
         wherein, the first annular cup-shaped seat is defined by a side wall surface of the support ring facing radially inward and by a flat annular end wall,
         wherein, the side wall surface and the collar define between them a radial clearance (G) when fitted during use, and
         wherein, the annular end wall is configured to come into axial abutment with the collar during use;
   an annular insert interference-fitted into the first seat, the annular insert comprising:
      a substantially rigid annular shield engaged integrally inside the first seat in contact with the support ring and configured to remain out of contact with the collar; and
      an annular element made of an elastomeric material configured to be mounted integrally as one piece on the annular shield at least partially radially on an inside of the annular shield,
         wherein, the annular element is configured to be interposed during use between the annular shield and a radially external side surface of the collar and to engage with the collar, so as to occupy the radial clearance (G), and
         wherein, the annular element provides a static hydraulic sealing action to the support ring assembly.

2. The support ring assembly of claim 1, wherein the annular element is configured to have an elasto-plastic behavior.

3. A support ring assembly for a railway axle configured to be coupled, during use, on a shaft end of the railway axle and to act as a shoulder for a rolling bearing mounted on the shaft end, the support ring assembly comprising:
   a support ring configured to be coupled, during use, in an axially abutting manner between the rolling bearing and a collar of the railway axle, the support ring comprising:
      a first axial end provided radially on an inside of a first annular cup-shaped seat,
         wherein, the first annular cup-shaped seat is defined by a side wall surface of the support ring facing radially inward and by a flat annular end wall,
         wherein, the side wall surface and the collar define between them a radial clearance (G) when fitted during use, and
         wherein, the annular end wall is configured to come into axial abutment with the collar during use;
   an annular insert interference-fitted into the first seat, the annular insert comprising:
      a substantially rigid annular shield engaged integrally inside the first seat; and
      an annular element made of an elastomeric material configured to be mounted integrally as one piece on the annular shield at least partially radially on an inside of the annular shield, wherein, the annular element is configured to be interposed during use between the annular shield and a radially external side surface of the collar and to engage with the collar, so as to occupy the radial clearance (G), and wherein, the annular element provides a static hydraulic sealing action to the support ring assembly, wherein the annular shield is made of a metal sheet and comprises:

a sleeve portion force fitted inside the first seat and engaged in contact with the side wall surface of the first seat; and a flange portion extending radially in a cantilever fashion and an outside of the sleeve portion at a first end of the support ring, wherein the flange portion is engaged in axial abutment against a first axial face of the first end of the support ring.

4. The support ring assembly of claim 3, wherein, the annular element covers at least a majority of a radially inner side surface of the sleeve portion and extends over at least part of a front face of the flange portion facing away from a front face of the first end of the support ring, and wherein, the annular element is fixed integrally as one piece with the sleeve portion and the flange portion of the annular shield by means of bonding due to vulcanization.

5. The support ring assembly of claim 4, wherein the annular element further comprises:

a bevel facing away from the flange portion and extending until flush with a radially inner annular surface of the annular element, wherein the bevel is provided on at least a portion of the front face of the flange portion.

6. The support ring assembly of claim 5, wherein the annular element further comprises:

a radially inner annular surface facing the collar and provided with at least two annular protuberances configured to contact the collar.

7. The support ring assembly of claim 6, wherein the annular protuberances comprise a curved radial profile with a radius of curvature (R), wherein the annular protuberances are configured to ensure a residual interference with the collar and create a seal between the support ring and the collar.

8. The support ring assembly of claim 7, wherein the radially inner annular surface of the annular element further comprises:

two distal cylindrical end sections, each section adjacent to a respective annular protuberance of the at least two annular protuberances; and at least one central section interposed between the at least two annular protuberances and arranged flush with the two distal cylindrical end sections, wherein the at least one central section has a curved radial profile defined by a second radius (R1).

9. The support ring assembly of claim 8, wherein the annular protuberances are axially spaced by a constant pitch (P), wherein a ratio of the first radius of curvature (R) and the pitch (P) is 1:3.

10. The support ring assembly of claim 9, wherein the annular element is configured to have an elasto-plastic behavior.

11. The support ring assembly of claim 6, wherein the annular element is configured to have an elasto-plastic behavior.

12. The support ring assembly of claim 5, wherein the support ring further comprises:

a flanged second axial end axially opposite the first end, extending radially on an outside of a radially outer side surface of the first axial end, the second axial end comprising a second annular seat defined by an annular front groove; and an annular spacer made of a synthetic plastic material having a substantially Z-shaped radial cross-section and a radially outer edge, wherein the radially outer edge snap engages inside the second annular seat and is configured to remain interposed between the support ring and the rolling bearing.

13. The support ring assembly of claim 3, wherein the annular element further comprises:

a radially inner annular surface facing the collar and provided with at least two annular protuberances configured to contact the collar.

14. The support ring assembly of claim 13, wherein the annular protuberances have a curved radial profile with a radius of curvature (R), wherein the annular protuberances are configured to ensure a residual interference with the collar and create a seal between the support ring and the collar.

15. The support ring assembly of claim 14, wherein the radially inner annular surface of the annular element further comprises:

two distal cylindrical end sections, each section adjacent to a respective annular protuberance of the at least two annular protuberances; and at least one central section interposed between the at least two annular protuberances and arranged flush with the two distal cylindrical end sections, wherein the at least one central section has a curved radial profile defined by a second radius (R1).

16. The support ring assembly of claim 15, wherein the annular protuberances are axially spaced by a constant pitch (P), wherein a ratio of the first radius of curvature (R) and the pitch (P) is 1:3.

17. A support ring assembly for a railway axle configured to be coupled, during use, on a shaft end of the railway axle and to act as a shoulder for a rolling bearing mounted on the shaft end, the support ring assembly comprising:

a support ring configured to be coupled, during use, in an axially abutting manner between the rolling bearing and a collar of the railway axle, the support ring comprising:

a first axial end provided radially on an inside of a first annular cup-shaped seat, wherein, the first annular cup-shaped seat is defined by a side wall surface of the support ring facing radially inward and by a flat annular end wall, wherein the side wall surface and the collar define between them a radial clearance (G) when fitted during use, and wherein, the annular end wall is configured to come into axial abutment with the collar during use;

an annular insert interference-fitted into the first seat, the annular insert comprising:

a substantially rigid annular shield engaged integrally inside the first seat; and an annular element made of an elastomeric material configured to be mounted integrally as one piece on the annular shield at least partially radially on an inside of the annular shield, wherein, the annular element is configured to be interposed during use between the annular shield and a radially external side surface of the collar and to engage with the collar, so as to occupy the radial clearance (G), and wherein, the annular element provides a static hydraulic sealing action to the support ring assembly, wherein the support ring further comprises:

a flanged second axial end axially opposite the first end, extending radially on an outside of a radially outer side surface of the first axial end, the second axial end comprising:

a second annular seat defined by an annular front groove; and an annular spacer made of a synthetic plastic material having a substantially Z-shaped radial cross-section and a radially outer edge, wherein the radially outer edge snap engages inside the second annular seat and is configured to remain interposed between the support ring and the rolling bearing.

18. The support ring assembly of claim 17, wherein the annular element further comprises:

a radially inner annular surface facing the collar and provided with at least two annular protuberances configured to contact the collar.

19. The support ring assembly of claim 18, wherein the radially inner annular surface of the annular element further comprises:

two distal cylindrical end sections, each section adjacent to a respective annular protuberance of the at least two annular protuberances; and at least one central section interposed between the at least two annular protuberances and arranged flush with the two distal cylindrical end sections, wherein the at least one central section has a curved radial profile defined by a second radius (R1).

20. The support ring assembly of claim 19, wherein the annular protuberances are axially spaced by a constant pitch (P), wherein a ratio of the first radius of curvature (R) and the pitch (P) is 1:3.

* * * * *